US 9,602,011 B1

(12) United States Patent
Baker

(10) Patent No.: US 9,602,011 B1
(45) Date of Patent: Mar. 21, 2017

(54) GATED BI-DIRECTIONAL DUAL-RAIL SERIES RESONANT CONVERTER POWER SUPPLY

(71) Applicant: Harman International Industries, Incorporated, Stamford, CT (US)

(72) Inventor: Eric Matthew Baker, Elkhart, IN (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/979,735

(22) Filed: Dec. 28, 2015

(51) Int. Cl.
*H02M 3/335* (2006.01)

(52) U.S. Cl.
CPC .............. *H02M 3/33507* (2013.01)

(58) Field of Classification Search
CPC ............ H02M 3/335; H02M 3/33507; H02M 3/33553; H02M 3/33546; H02M 3/33569; H02M 3/33576; H02M 3/33592
See application file for complete search history.

(56) References Cited

U.S. PATENT DOCUMENTS

| | | | |
|---|---|---|---|
| 6,853,568 B2 * | 2/2005 | Li ..................... | H02M 3/33592 363/65 |
| 7,796,408 B2 * | 9/2010 | Wang ................ | H02M 3/33592 363/21.02 |
| 8,457,199 B2 | 6/2013 | Jebb | |
| 9,112,423 B2 | 8/2015 | Ando et al. | |
| 2007/0064452 A1 * | 3/2007 | Chang ............... | H02M 3/33592 363/20 |
| 2015/0049525 A1 * | 2/2015 | Mu ................... | H02M 7/53871 363/37 |
| 2015/0365006 A1 * | 12/2015 | Choi ................. | H02M 3/33592 363/21.02 |

* cited by examiner

*Primary Examiner* — Matthew Nguyen
(74) *Attorney, Agent, or Firm* — Brooks Kushman P.C.

(57) ABSTRACT

A switching stage includes a first plurality of switches configured to produce an alternating current from a bulk voltage. A transformer has a primary and a plurality of secondaries, the primary configured to receive the alternating current. A second plurality of switches are coupled to a first of the plurality of secondaries through a first resonant filter to provide a first voltage output. A third plurality of switches are coupled to a second of the plurality of secondaries through a second resonant filter to provide a second voltage output, the second voltage output being of opposite polarity to the first voltage output. A controller is configured to control the second plurality of switches and the third plurality of switches according to on-and-off state of the first plurality of switches and criteria including whether an absolute value of the first voltage output or the second voltage output exceeds a reference voltage.

20 Claims, 13 Drawing Sheets

GATED BI-DIRECTIONAL DUAL-RAIL SERIES RESONANT CONVERTER POWER SUPPLY

TECHNICAL FIELD

Aspects disclosed herein generally relate to gated bidirectional resonant DC-DC converter that can provide power transfer over a galvanically-isolated barrier from an input to set of dual outputs, from any one output to the other, or from any or both outputs to the input.

BACKGROUND

An amplifier includes an electronic circuit designed to isolate or adjust the level of signals to be suitable for driving a circuit or load. In an audio context, an audio amplifier may be arranged to operate on signals having frequencies from approximately 20 hertz (Hz) to 20 kilohertz (kHz). For instance, an audio amplifier may be arranged to amplify line-level audio signals to a level suitable for driving loudspeakers or other sound-reproducing devices.

The circuit arrangement of the audio amplifier may be constructed to balance criteria such as power efficiency, dissipation, linearity, and circuit complexity. Similarly, the power supply for the amplifier may be arranged based on various requirements. These requirements may depend on the amplifier circuit arrangement as well as on other platform-based parameters. As some examples, the power supply may be arranged to account for average current level, maximum tolerable ripple voltage, power supply output impedance, and peak current limitations, as well as non-electrical issues such as component spacing and cost limitations.

SUMMARY

In a first illustrative embodiment, a switching stage includes a first plurality of switches configured to produce an alternating current from a bulk voltage. A transformer has a primary and a plurality of secondaries, the primary configured to receive the alternating current. A second plurality of switches is coupled to a first of the plurality of secondaries through a first resonant filter to provide a first voltage output. A third plurality of switches are coupled to a second of the plurality of secondaries through a second resonant filter to provide a second voltage output, the second voltage output being of opposite polarity to the first voltage output. A controller is configured to control the second plurality of switches and the third plurality of switches according to on-and-off state of the first plurality of switches and criteria including whether an absolute value of the first voltage output or the second voltage output exceeds a reference voltage.

In a second illustrative embodiment, a system includes a bidirectional mode controller of a series resonant converter providing first and second voltage outputs. The series resonant converter including first and second switches configured to provide a pulse train output to a primary of a transformer, third and fourth switches connected to a first secondary of the transformer, and fifth and sixth switches connected to a second secondary of the transformer. The controller is configured to, in a first mode, when neither the first voltage output nor an absolute value of the second voltage output exceeds a reference voltage, set the third and sixth switches to a state synchronous in on-and-off time with the first switch for the first voltage output, and set the fourth and fifth switches to a state synchronous in on-and-off time with the second switch for the second voltage output. The controller is also configure to, in a second mode, when at least one of the first voltage output or the absolute value of the second voltage output exceeds the reference voltage, control the third, fourth, fifth, and sixth switches to provide a path for current to flow back from one or more of the first voltage output or the second voltage output to one or more of the first secondary or the second secondary of the transformer.

In a third illustrative embodiment, a method includes providing, by a bidirectional mode controller of a series resonant converter, first and second voltage outputs, the series resonant converter including first and second switches providing a pulse train output to a primary of a transformer, third and fourth switches connected to a first secondary of the transformer, and fifth and sixth switches connected to a second secondary of the transformer. The method also includes, when neither the first voltage output nor an absolute value of the second voltage output exceeds a reference voltage, setting the third and fifth switches to a state synchronous in on-and-off time with the first switch for the first voltage output, and set the fourth and sixth switches to a state synchronous in on-and-off time with the second switch for the second voltage output. The method also includes when at least one of the first voltage output or the absolute value of the second voltage output exceeds the reference voltage, controlling the third, fourth, fifth, and sixth switches to provide a path for current to flow back from one or more of the first voltage output or the second voltage output to one or more of the first secondary or the second secondary of the transformer.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
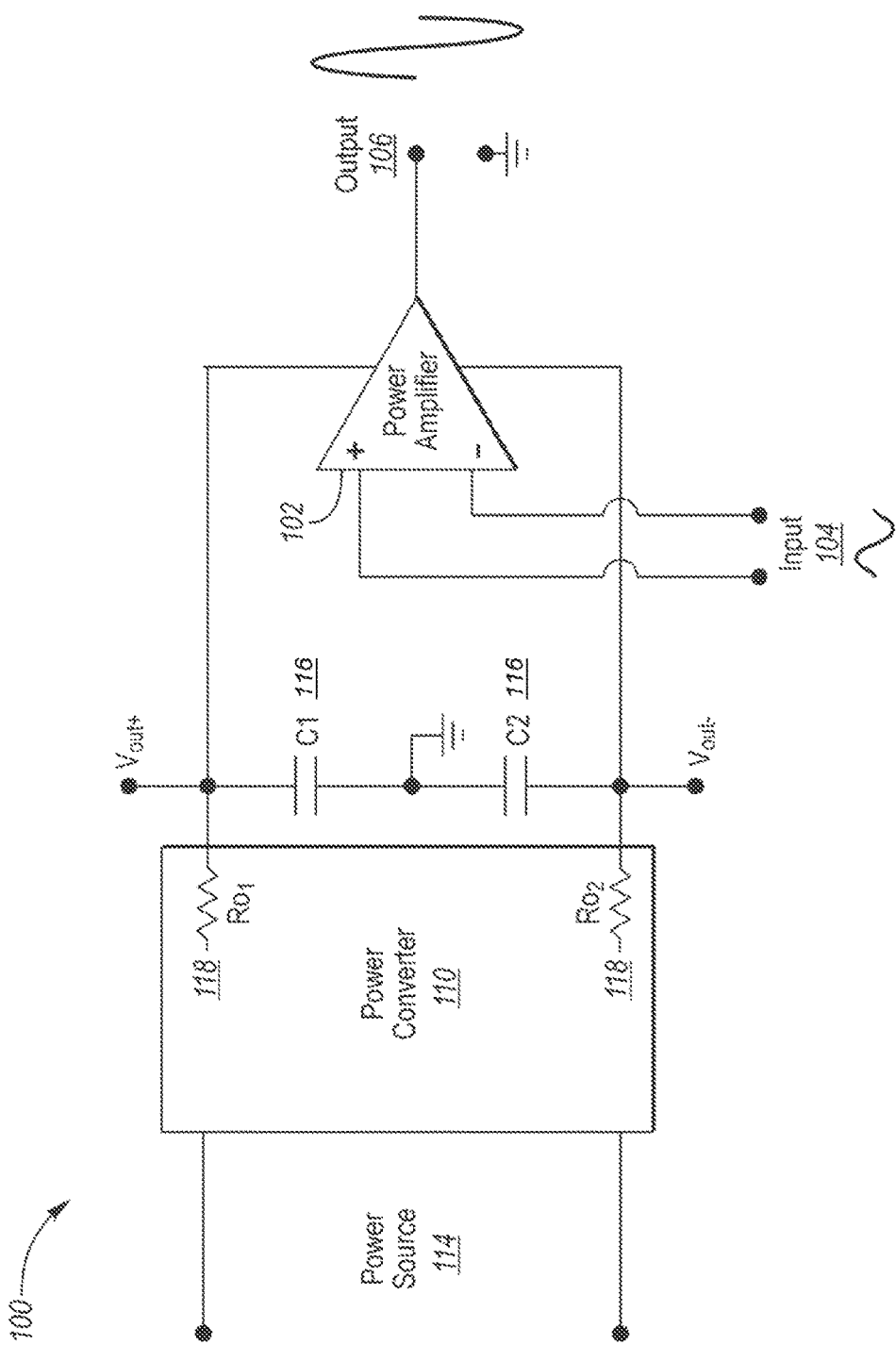
FIG. 1 is a block diagram of a simplified power amplifier.

FIG. 1 is a block diagram 100 of a simplified power amplifier 102. A power amplifier 102, such as the illustrated in the diagram 100, operates by taking a reference or input signal 104, which is an alternating current (AC) voltage that alternates in time from positive to negative polarity, and increasing the amplitude of the input signal 104 to provide an output signal 106. The output signal 106 may then be coupled to a load 108. In an example, the load 108 may be a transducer that converts electrical energy to mechanical energy.

The power amplifier 102 may output both positive and negative voltages, with some simple arrangements having a simple set of direct current (DC) power supply rails $V_{out}$, i.e., one rail of positive polarity $V_{out^+}$ and a second rail of negative polarity $V_{out^-}$. The rails may be generated by a power converter 110 configured to provide the power from which the power amplifier 102 may draw. In an example, the power converter 110 may include multiple stages, or in other examples, a single stage connected to an AC or DC power source 114. The arrangement of the power converter 110 inherently has an equivalent series impedance associated with each output, $Ro_1$ and $Ro_2$, along with a maximum throughput power capability. The maximum throughput power capability may be limited by various factors, such as the underlying components of the arrangement, cost, efficiency, and physical space considerations. In order to supplement the limited maximum capability of the power converter 110, energy may be stored within capacitors 116 electrically connected to the outputs 118 of the power converter 110 that provide a low-impedance path for current to flow to the power amplifier 102. As the output of the power amplifier 102 swings in one direction, the rail voltage $V_{out}$ will dip in response to the increasing current demand from the load 108 connected to the power amplifier output.

Figure 2:
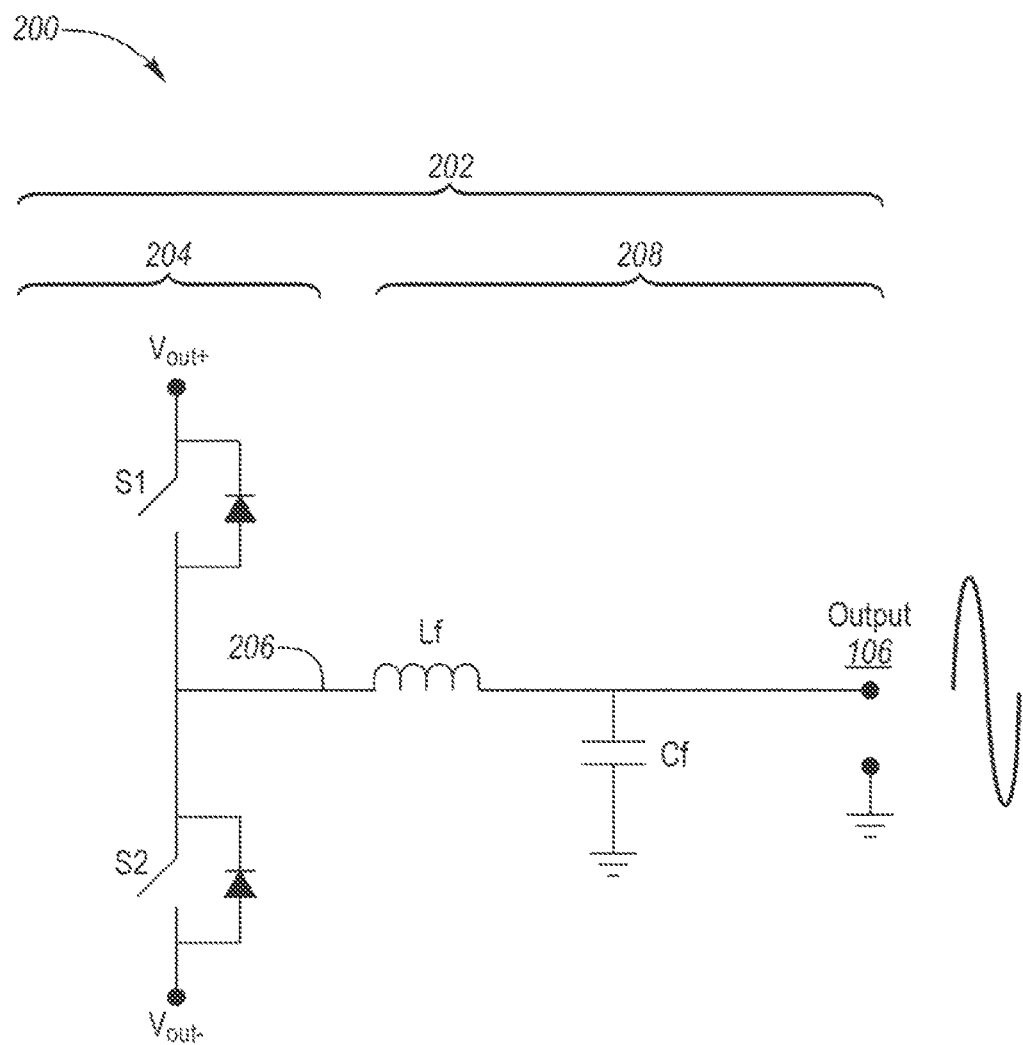
FIG. 2 illustrates a block diagram of a simplified switching power amplifier having a pulse-width-modulated implementation.

FIG. 2 illustrates a block diagram 200 of a simplified switching power amplifier 202 having a pulse-width-modulated (PWM) implementation. The example class-D switching power amplifier 202 includes a switching stage 204 in which switches $S_1$ and $S_2$ alternate in conduction and provide a switching stage output 206. The switching stage output 206 is provided to an output stage 208 in which the switching stage output 206 is averaged by a filter including inductor $L_f$ and capacitor $C_f$ to produce the output signal 106. Through the use of PWM, efficiency of the power amplifier 202 may be greatly increased over a standard linear power amplifier 102 design. However, the switching stage output 206 of the switching stage 204 is a pulse train that must be averaged in time to more faithfully reconstruct the input audio signal 104 in the output signal 106.

It should be noted that the simplified switching power amplifier 202 illustrated in the diagram 200 is merely one example, and other switched-mode designs, such as class-I or other class-D designs may be used. Regardless, as compared to the power amplifier 102, when the output of the switching power amplifier 202 swings in one direction, in many designs the opposing rail $V_{out}$ may be bumped due to the circulating current in the output stage 208.

Figure 3:
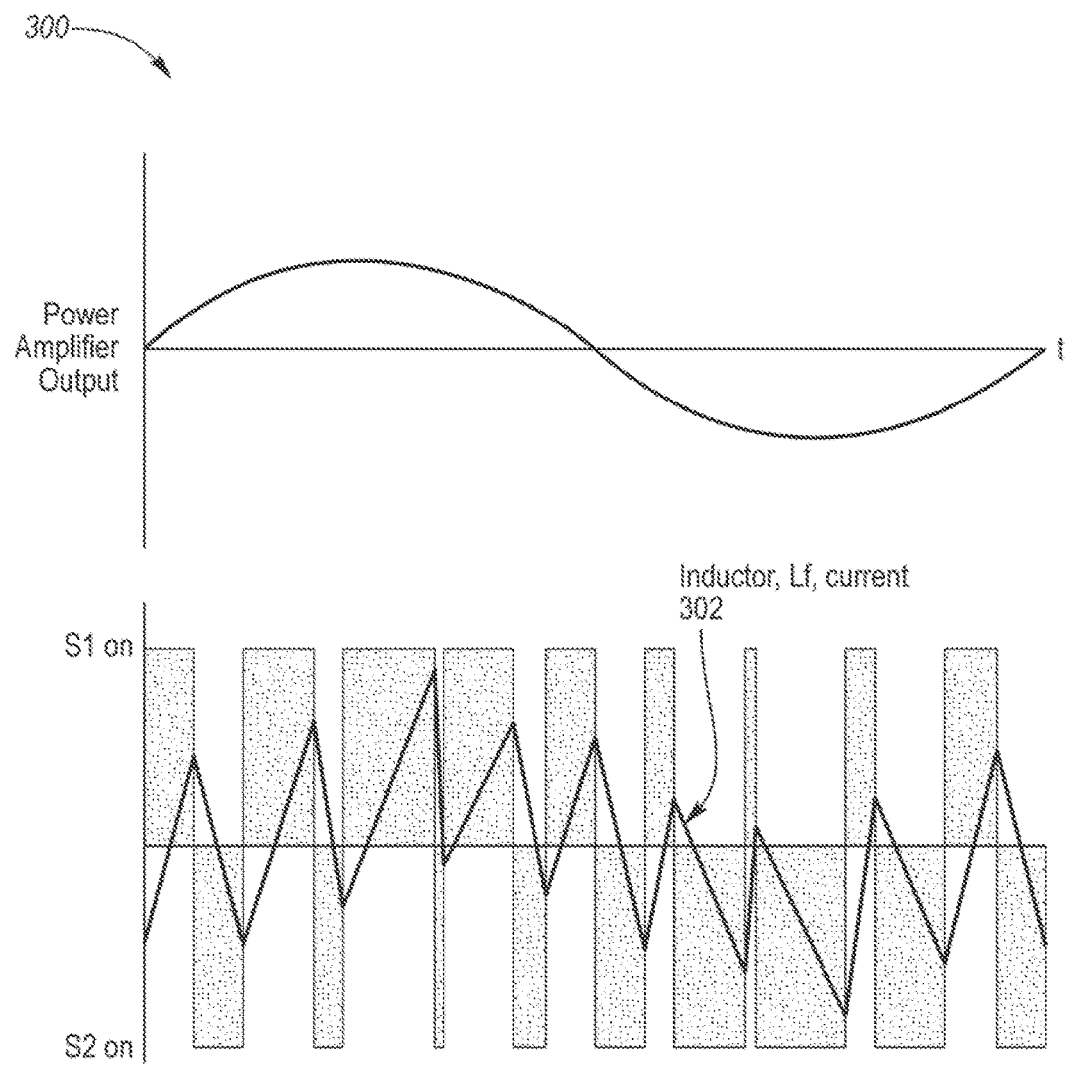
FIG. 3 illustrates an exaggerated diagram of a hypothetical inductor current.

FIG. 3 illustrates an exaggerated diagram 300 of a hypothetical inductor current 302. The inductor current 302, as shown, represents an example of the switching stage output 206 of the switching stage of the simplified class-D power amplifier 202 illustrated in FIG. 2. Notably, the inductor current 302 can draw from both DC rails $V_{out}$ (e.g., positive rail $V_{out^+}$ and negative rail $V_{out^-}$) even though the current to the load 108 is flowing through the power amplifier 202 in a single direction.

When the switching stage output 206 of the switching stage 204 of the power amplifier 202 has an effective duty cycle of 50%, current drawn from the positive rail $V_{out^+}$ (switch $S_1$ on) into the inductor is discharged (switch $S_2$ on) by the negative rail $V_{out^-}$ creating average draw on the rails $V_{out}$ of zero. However, as the output signal 106 of the power amplifier 202 swings to one polarity-respective switch, that switch has a relatively greater duty cycle and the opposite switch has a relatively lower duty cycle. In such a situation, current is stored in the inductor $L_f$, and increases charge stored opposite from the polarity in which the output signal 106 is moving.

For example, when switch $S_1$ is on, switch $S_2$ is off, and the duty cycle of switch $S_1$ is greater than 50%, the average current rises in the inductor flowing from the positive rail $V_{out^+}$, causing the rail $V_{out^+}$ to sag due to the output impedances $Ro_1$ and $Ro_2$. During the time period when the switch $S_2$ is on and the switch $S_1$ is off, this current continues to flow in the inductor $L_f$; however, the flow is now from the negative rail $V_{out^-}$. This causes the charge to grow in the negative rail capacitor(s) as shown, for example, as $C_2$ in FIG. 1.

As the frequency being reproduced by the switching power amplifier 202 goes down, the amount of charge stored by the opposite rail $V_{out}$ during an output swing can produce voltages that may be too high for devices of the amplifier 202 to handle. As a consequence, the devices may suffer issues such as avalanche breakdown. One way to address these issues is to use large amounts of energy storage, such that charge moving from one rail $V_{out}$ to the other creates minimal voltage rise on the rails $V_{out}$.

Figure 4:
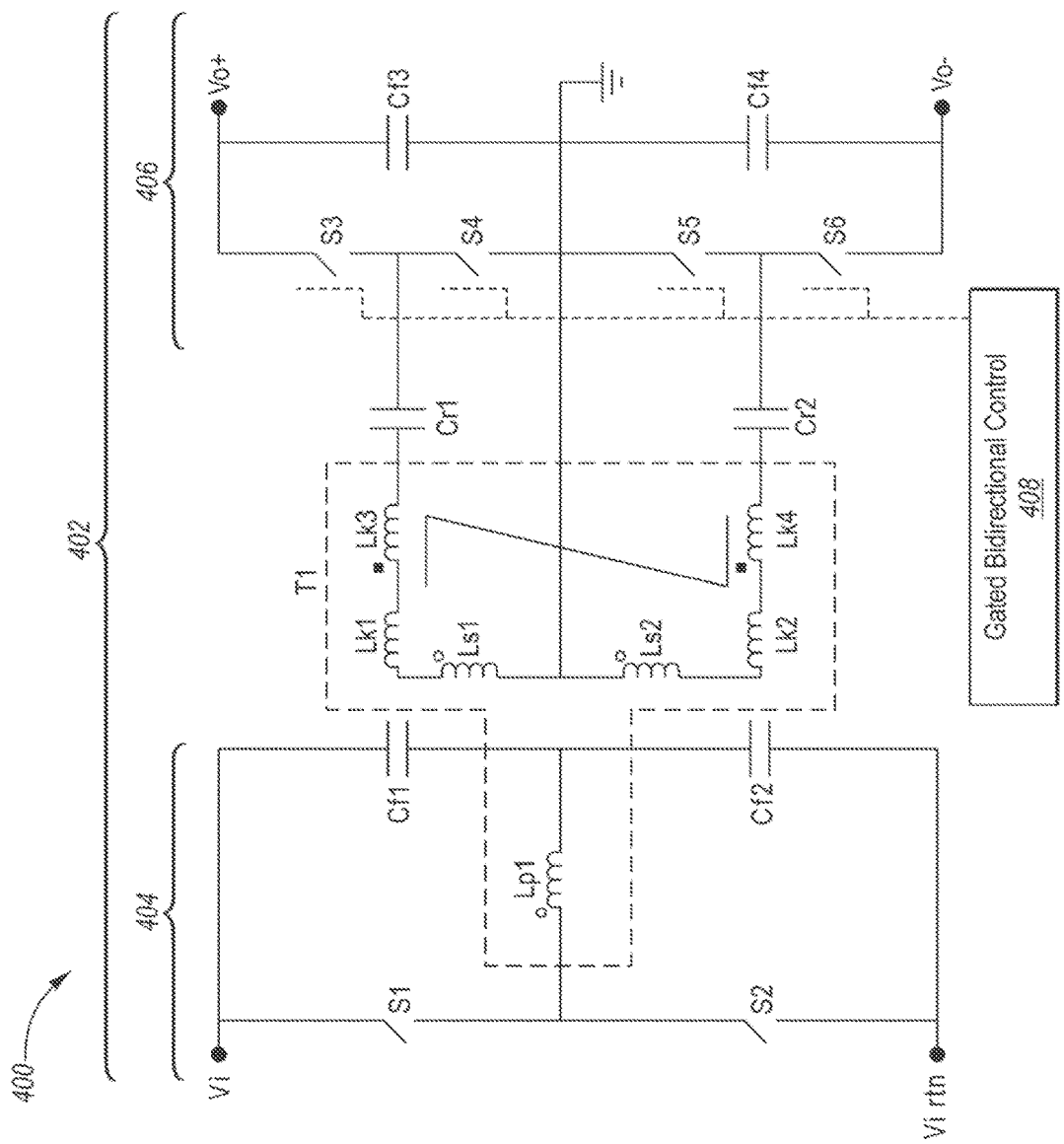
FIG. 4 illustrates an example diagram of a gated bidirectional series resonant converter.

FIG. 4 illustrates an example diagram 400 of a gated bidirectional series resonant power converter 402. The gated bidirectional power converter 402 is a power converter that can allow current to flow in a direction of higher absolute potential to areas with lower potential. The gated bidirectional power converter 402 may accordingly allow for a power amplifier 202 to better handle circumstances in which greater power is required, such as for high-volume low-frequency amplification, without the use of excessive amounts of energy storage, e.g., for rail stabilization.

The bidirectional power converter 402 includes a transformer $T_1$ having a primary $Lp_1$ and secondaries $Ls_1$ and $Ls_2$. The transformer $T_1$ also includes resonant inductors $Lk_1$, $Lk_2$, $Lk_3$, and $Lk_4$. In the examples described herein, the resonant inductors are integrated with the transformer $T_1$.

However, it should be noted that in other examples the resonant inductors Lk may be implemented as externally-realized parts. The resonant inductors $Lk_1$ and $Lk_3$ are connected in series to the $Ls_1$ secondary, while the resonant inductors $Lk_2$ and $Lk_4$ are connected in series to the $Ls_2$ secondary. The integrated transformer $T_1$ also provides for a center tap output that, as illustrated, may be connected to ground.

As shown in the diagram 400, the gated bidirectional series resonant converter 402 combines a half-bridge 404 on the primary $Lp_1$ of the integrated transformer $T_1$, and two half-bridges 406 on the secondary side $Ls_1$ and $Ls_2$ of the integrated transformer $T_1$, coupled to the integrated transformer $T_1$ through capacitors $Cr_1$ and $Cr_2$. The half-bridge 404 includes switches $S_1$ and $S_2$ that allow a voltage $V_i$ from a power source 114 to be applied to the primary $Lp_1$ in either direction, across filter capacitors $Cf_1$ and $Cf_2$. The capacitors $Cf_1$ and $Cf_2$ serve to ensure the offset to $T_1$ is, on average, zero. A first of the half-bridges 406 allows for application of the voltage between $Ls_1$ and the center tap of the transformer $T_1$ to a $V_o$+ output in either direction across filter capacitor $Cf_3$ and a second of the half-bridges 406 allows for application of the voltage between the center tap and $Ls_2$ of the transformer $T_1$ to a $V_o$- output in either direction across filter capacitor $Cf_4$.

The switches $S_1$-$S_6$ may be implemented using various types of switching devices, such as metal-oxide-semiconductor field-effect transistors (MOSFETs) with integral body diodes, insulated-gate bipolar transistors (IGBTs) with internal co-packed or external anti-parallel diodes, and the like. The switches $S_3$-$S_6$ may be controlled by signals generated by a gated bidirectional switch control 408 based on factors such as the state of the switches $S_1$ and $S_2$. As discussed in detail below, through the control of the switches $S_1$ through $S_6$, the gated bidirectional series resonant converter 402 supports multiple modes of operation.

Figure 5:
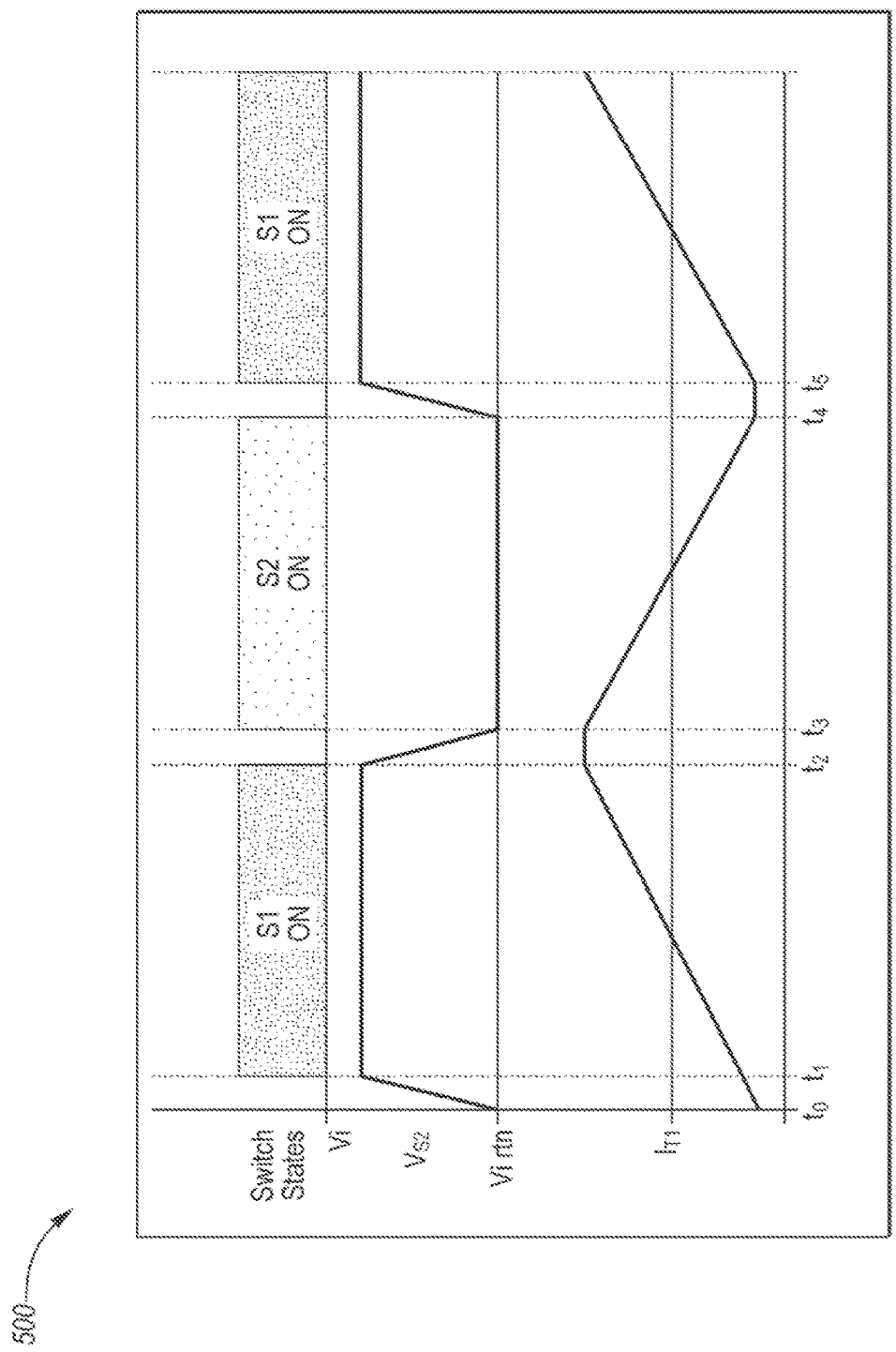
FIG. 5 illustrates an example diagram of a first mode of operation of the gated bidirectional series resonant converter.

FIG. 5 illustrates an example diagram 500 of a first mode of operation of the gated bidirectional series resonant converter 402. In the first mode, referred to as a forward mode, the power flow is from the primary $Lp_1$ ($V_i$-$V_i$ rtn), to the secondaries $Ls_1$ and $Ls_2$, to $V_o$+ and $V_o$-. At a light load, the magnetizing inductance of $T_1$ is capable of achieving zero voltage switching (ZVS) in both $S_1$ and $S_2$. The magnetizing inductance within $T_1$ stores current during each switch transition. $I_{T1}$ may refer to the current in to $Lp_1$ and the magnetizing current of the transformer $T_1$. This current may ramp up to a maximum as described by Eq. 1 (as set forth below). Because the current is nearly constant during the interval where both switches are off (deadtime), the minimum deadtime ($t_2$ to $t_3$) necessary for ZVS may be found using Eq. 2 (as set forth below).

$$I_L = \frac{1}{L} \cdot \int_{t_1}^{t_2} \left( \frac{Vi - Vi\_rtn}{2} \right) dt \quad (1)$$

$$deadtime = \left( \frac{Vi - Vi\_rtn}{I_L} \right) \cdot Cpar \quad (2)$$

Figure 6:
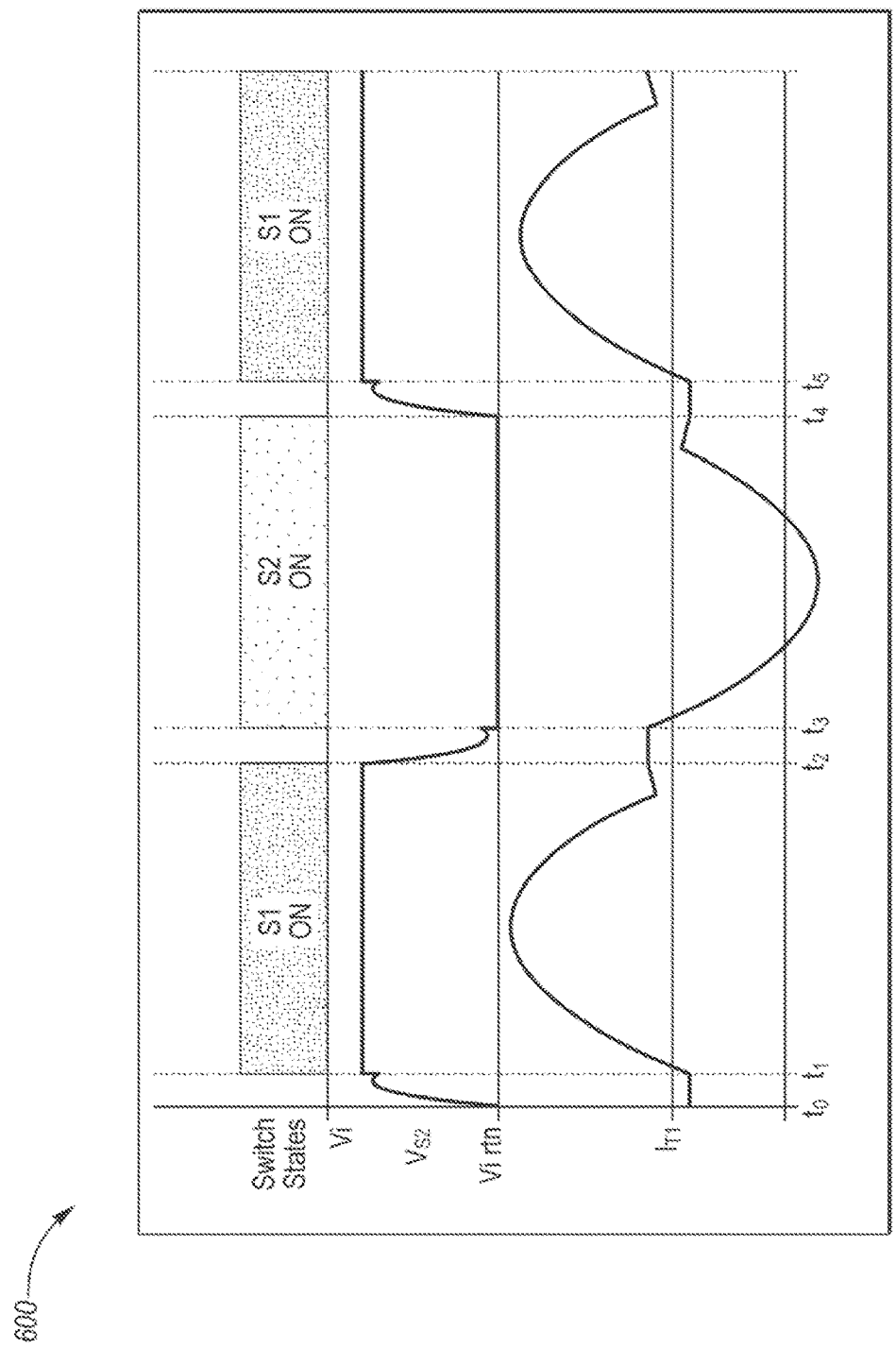
FIG. 6 illustrates an example diagram of a second mode of operation of the gated bidirectional series resonant converter.

FIG. 6 illustrates an example diagram 600 of a second mode of operation of the gated bidirectional series resonant converter 402. The second mode of operation may also be referred to as a forward mode, as power passes from the input side through the transformer $T_1$ to the output side, where energy is stored in $Cf_3$ and $Cf_4$ and used by the amplifier 202. As the diagram 600 illustrates a forward mode, in the example energy moves only in the direction of in-to-out. As can be seen in the diagram 600, this mode of operation yields zero current switching (ZCS) for the primary side switches $S_1$ and $S_2$ along with near ZVS, as the voltage does not quite transition before the devices are turned on.

Due to both of the transformer $T_1$ secondaries (e.g., $Ls_1$ and $Ls_2$) conducting at the same time, inductors $Lk_1$ and $Lk_2$ become paralleled to form $Lk_{1\_2}$, where $Lk_{1\_2}=0.5*Lk_1=0.5*Lk_2$. Inductors $Lk_3$ and $Lk_4$ have opposing currents and are well-coupled, thus, their inductance is cancelled. $Cr_1$ and $Cr_2$, which may be external equal-valued capacitors, also become paralleled in this mode forming $Cr_{1\_2}$, where $Cr_{1\_2}=Cr_1+Cr_2$. The current shape through the transformer $T_1$ is dominated by the resonance of $Lk_{1\_2}$ and $C_{1\_2}$. The resonant frequency, fr_1, of this tank is equal to the formula seen as Eq. 3 (as set forth below) and is designed to be greater than the switching frequency of the converter 402.

$$fr\_1 = \frac{1}{2 \cdot \pi \cdot \sqrt{(Lk_{1\_2} \cdot Cr_{1\_2})}} = \frac{1}{2 \cdot \pi \cdot \sqrt{(Lk_1 \cdot Cr1)}} = \frac{1}{2 \cdot \pi \cdot \sqrt{(Lk_2 \cdot Cr2)}} \quad (3)$$

Peak current through the resonant tank is limited by the voltage available at the input, the switching frequency, and tank impedance. An equation for determining the maximum current through the tank is shown as Eq. 4 (as set forth below), where n is the ratio of secondary turns over the primary turns. This is useful in determining a safe impedance for the tank, such that primary-side devices are not damaged in the event of a short across the secondary rails $V_o$+ and $V_o$-, or when limiting startup currents when the input is fully charged and the output is fully discharged.

$$I_{pk1\_max} = \frac{\frac{2}{\pi} \cdot (Vi - Vi\_rtn)}{\left| \frac{1}{2 \cdot \pi \cdot fsw \cdot Cr1\_2 \cdot i} + 2 \cdot \pi \cdot fsw \cdot Lr1\_2 \cdot i \right| \cdot \left( \frac{1}{n} \right)^2} \quad (4)$$

$$I_{pk1} = \frac{\frac{2}{\pi} \cdot \left( Vi - Vi\_rtn - \frac{Vout_{min}}{n} \right)}{\left| \frac{1}{2 \cdot \pi \cdot fsw \cdot Cr1\_2 \cdot i} + 2 \cdot \pi \cdot fsw \cdot Lr1\_2 \cdot i \right| \cdot \left( \frac{1}{n} \right)^2}$$

In the second mode, switches $S_3$-$S_6$ are kept off and the passive diodes either co-packed or parasitic within the devices are used to conduct the current on the secondary. The topology for this mode of operation may be considered to be that of a fixed-frequency series resonant converter with a voltage-doubled secondary. The gain of the resonant portion of this system, Av, can be used with the turns ratio of the transformer for predicting the voltage output of the converter with a resistive load, RL, across the two outputs. This gain is shown as Av in Eq. 5 (as set forth below).

$$Av = \sqrt{\frac{(RL^2 \cdot fsw^2 \cdot Cr^2)}{(RL^2 \cdot fsw^2 \cdot Cr^2 + 4 \cdot \pi^2 \cdot n^4 - 32 \cdot \pi^4 \cdot n^4 \cdot Lr \cdot fsw \cdot Cr + 64\pi^6 \cdot n^4 \cdot fsw^2 \cdot Cr^2)}} \quad (5)$$

Figure 7:
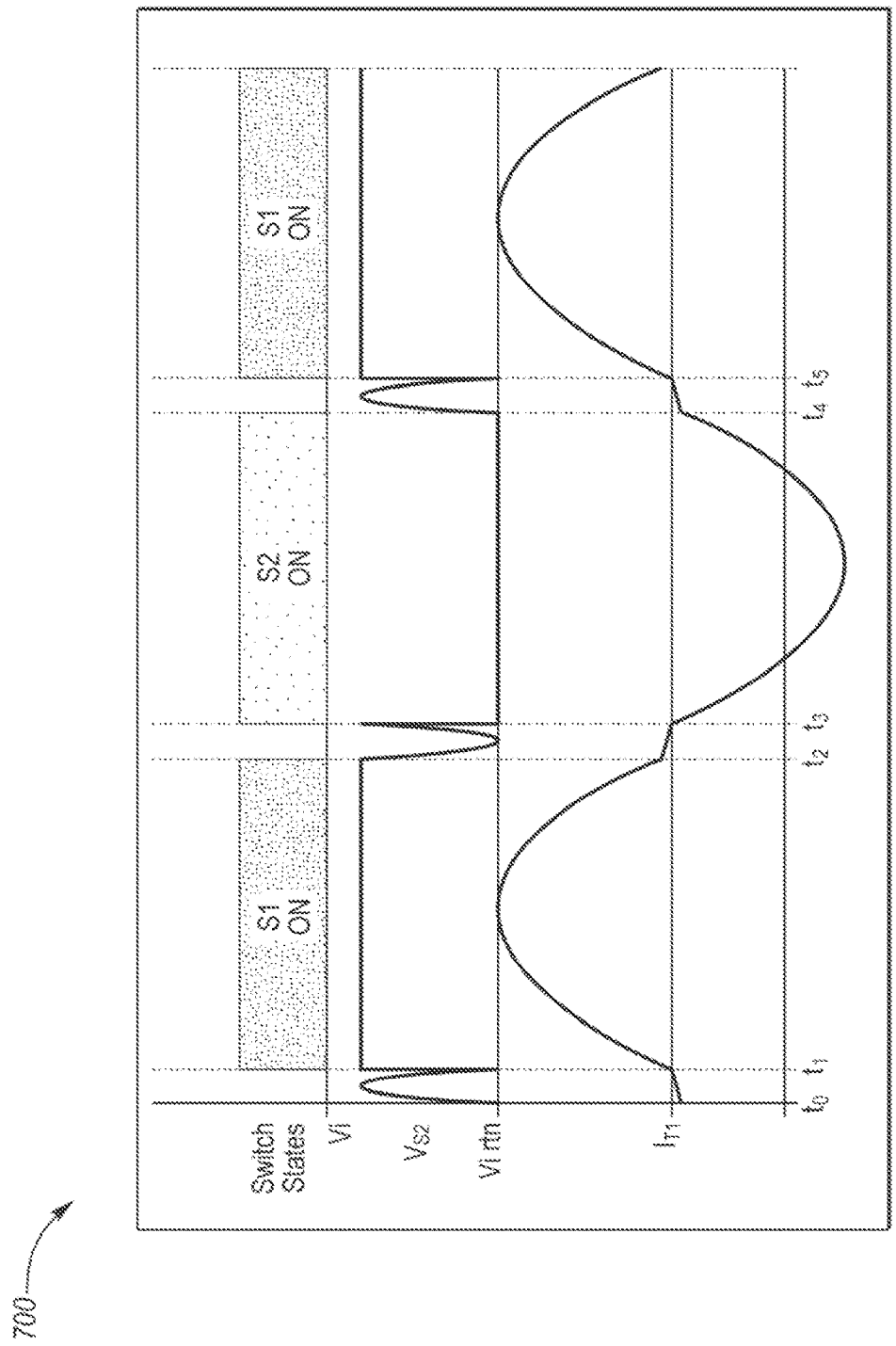
FIG. 7 illustrates an example diagram of a third mode of operation of the gated bidirectional series resonant converter.

Where:
RL: resistive load placed from $V_o$+ to $V_o$-
fsw: switching frequency
n: transformer secondary-to-primary turns ratio Ns/Np
Cr: $Cr_{1\_2}$ where $Cr_{1\_2}=Cr_1+Cr_2$
Lr: $Lk_{1\_2}$ where $Lk_{1\_2}=0.5*Lk_1=0.5*Lk_2$ FIG. 7 illustrates an example diagram 700 of a third mode of operation of the gated bidirectional series resonant converter 402. The third mode of operation is a variation on the second mode, where instead of the load being across both outputs $V_o+$ to $V_o-$, the load is primarily on one output. Here, the inductance of the resonant tank is either Lk1+Lk3 or Lk2+Lk4, depending on the output being loaded. Only a single capacitor $Cr_1$ or $Cr_2$ is used when calculating the resonant frequency, as shown in Eq. 6 (set forth below).

$$\text{fr\_2} = \frac{1}{2 \cdot \pi \cdot \sqrt{(Lk1 + Lk3) \cdot Cr1}} = \frac{1}{2 \cdot \pi \cdot \sqrt{(Lk2 + Lk4) \cdot Cr2}} \quad (6)$$

Since the inductance is much larger in this configuration, and the capacitance only cut in half, the resonant frequency will be reduced allowing operation closer to resonance. The peak current available in the switches of the primary side will then be equal to the value shown in Eq. 7 (as set forth below) when there is a short only on one rail and not the other.

$$I_{pk2\_max} = \frac{\frac{2}{\pi} \cdot (Vi - Vi\_rtn)}{\left|\frac{1}{2 \cdot \pi \cdot fsw \cdot Cr1 \cdot i} + 2 \cdot \pi \cdot fsw \cdot (Lk1 + Lk3) \cdot i\right| \cdot \left(\frac{1}{n}\right)^2} = \quad (7)$$

$$\frac{\frac{2}{\pi} \cdot (Vi - Vi\_rtn)}{\left|\frac{1}{2 \cdot \pi \cdot fsw \cdot Cr2 \cdot i} + 2 \cdot \pi \cdot fsw \cdot (Lk2 + Lk4) \cdot i\right| \cdot \left(\frac{1}{n}\right)^2}$$

$$I_{pk2\_max} = \frac{\frac{2}{\pi} \cdot \left(Vi - Vi\_rtn - \frac{Vout_{min}}{n}\right)}{\left|\frac{1}{2 \cdot \pi \cdot fsw \cdot Cr1 \cdot i} + 2 \cdot \pi \cdot fsw \cdot (Lk1 + Lk3) \cdot i\right| \cdot \left(\frac{1}{n}\right)^2} =$$

$$\frac{\frac{2}{\pi} \cdot \left(Vi - Vi\_rtn - \frac{Vout_{min}}{n}\right)}{\left|\frac{1}{2 \cdot \pi \cdot fsw \cdot Cr2 \cdot i} + 2 \cdot \pi \cdot fsw \cdot (Lk2 + Lk4) \cdot i\right| \cdot \left(\frac{1}{n}\right)^2}$$

The waveform in the diagram 700 shows the lower resonant frequency operation in which the gated bidirectional series resonant converter 402 has now begun to lose ZVS on $S_1$ and $S_2$ when operated with fixed dead time. However, $S_1$ and $S_2$ are soft-switched at turn off, as seen by the current transitioning to near zero just before the each switch is driven to turn off.

During startup, when the gated bidirectional series resonant converter 402 is loaded differentially, Eq. 4 may be used when sizing the $T_1$ transformer $Lp_1$ primary-side switches $S_1$ and $S_2$ and calculating the tank values. Thus, when there is a time-dependent asymmetric load, the gated bidirectional series resonant converter 402 operates in the third mode. Hence, the peak current capability may be driven by the difference between the primary $Lp_1$ voltage and the reflected voltage from the secondary Ls back to the primary $Lp_1$. In general, the fixed-frequency series resonant converter motivates current flow due to voltage difference and is limited in current by tank impedance.

Figure 8:
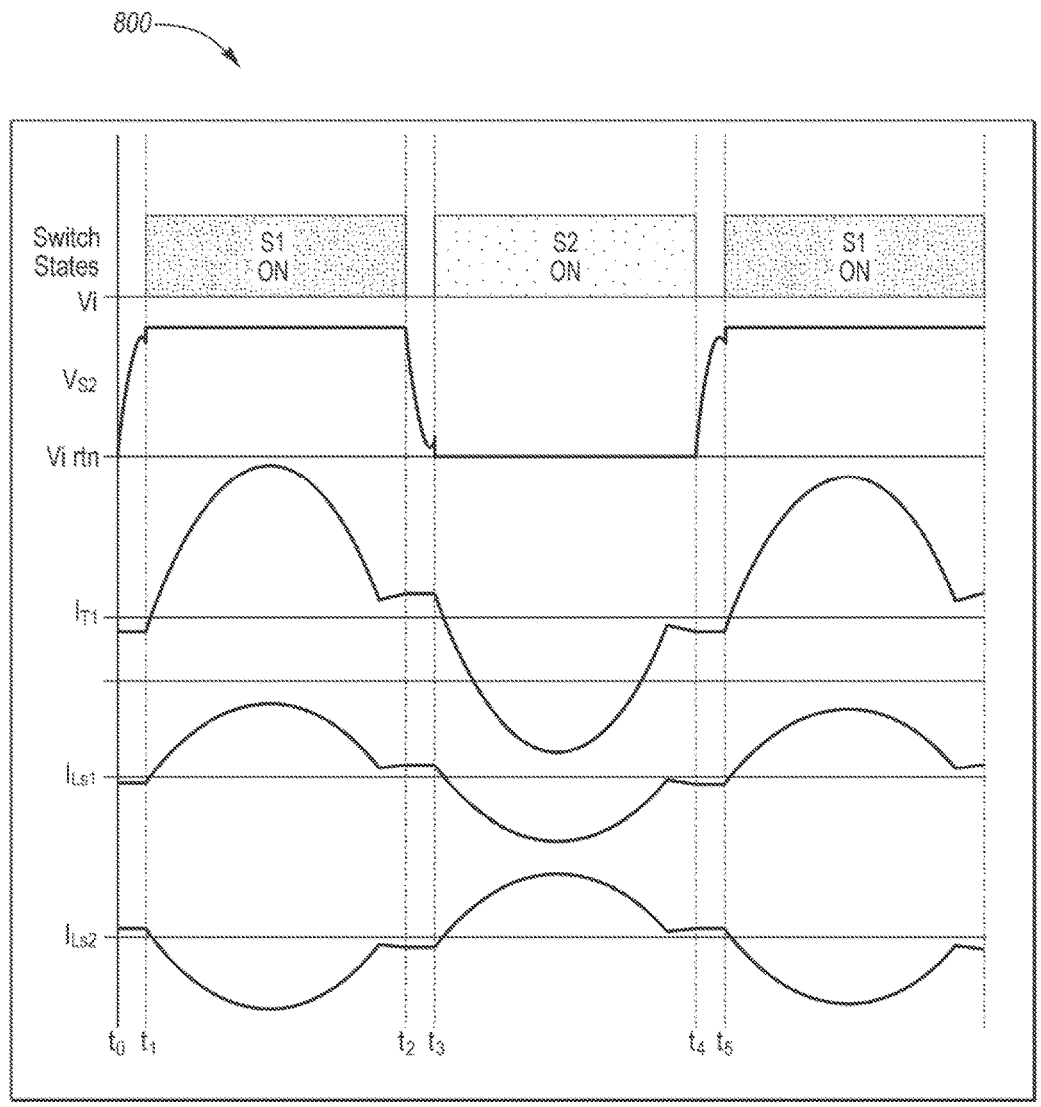
FIG. 8 illustrates an example diagram of the second mode of operation of the gated bidirectional series resonant converter with secondary side currents shown.

FIG. 8 illustrates an example diagram 800 of the second mode of operation of the gated bidirectional series resonant converter 402 (e.g., similar to the diagram 600) with secondary side currents shown. As shown in the diagram 800, the converter 402 is operating in mode two, where energy flows only from the primary $Lp_1$ to secondary (e.g., $Ls_1$, $Ls_2$). The secondary currents are shown in the diagram 800 as $I_{LS1}$ and $I_{LS2}$, and are out-of-phase in the mode, charging the outputs $V_o+$ and $V_o-$ simultaneously with opposite polarity.

Up to this point, the operation of the gated bidirectional series resonant converter 402 topology is switched to operate similar to that of a fixed-frequency series resonant converter. However, the gated bidirectional series resonant converter 402 is further able to gate the secondary side switches $S_3$-$S_6$ into bidirectional operation, which allows current to flow from any one secondary (e.g., $Ls_1$, $Ls_2$) to the other secondary (e.g., $Ls_2$, $Ls_1$) or back to the primary $Lp_1$ motivated by potential difference and limited by tank impedance.

Figure 9:
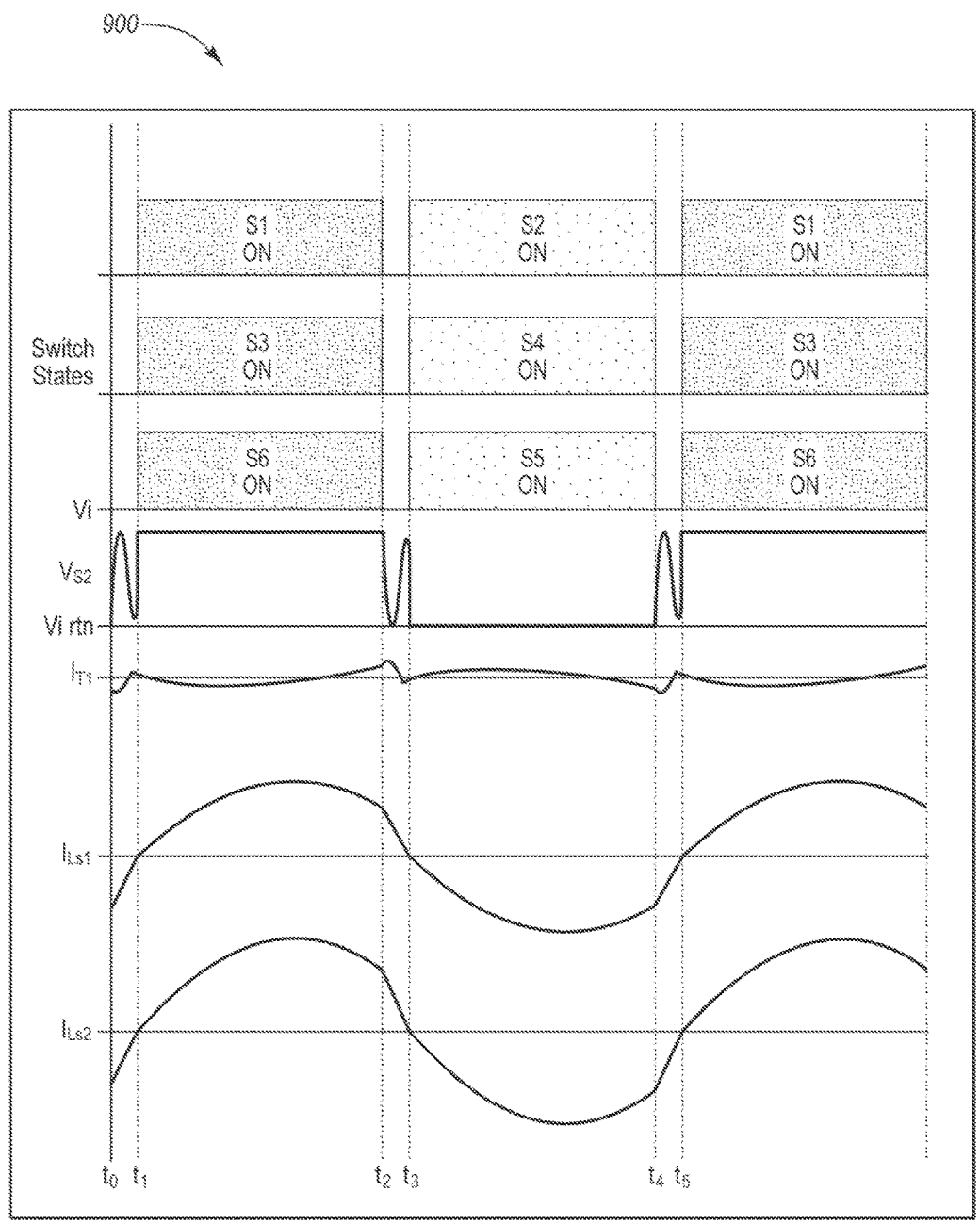
FIG. 9 illustrates an example diagram of a fourth mode of operation of the gated bidirectional series resonant converter with secondary side currents shown in CCM operation.

FIG. 9 illustrates an example diagram 900 of a fourth mode of operation of the gated bidirectional series resonant converter 402 with secondary side-currents shown in continuous conduction mode (CCM) operation.

As indicated above, when a switched mode amplifier 202 is driven to sufficiently low frequency, the outputs $V_o$ of the gated bidirectional series resonant converter 402 may become significantly asymmetrically-loaded. When this occurs, energy is moved from the loaded rail to the amplifier output 106, however, energy is also moved from the loaded output 106 to the unloaded output 106 through the energy stored in the filter of the output stage 208 of the switched mode amplifier 202.

By actively gating the secondary side switches $S_3$-$S_6$, current can now flow in any direction where the absolute magnitude is greatest to those that are less. Notably, the secondary switch on-and-off time is synchronous with the primary-side switches $S_1$ and $S_2$. More specifically, $S_1$ is in sync with $S_3$ and $S_6$, while $S_2$ is in sync with $S_4$ and $S_5$. This simplifies the drive signaling required, as all gate drive signals can be derived from two 180-degree phase-shifted pulse trains with fixed dead time between switching transitions.

Once the gated bidirectional series resonant converter 402 is actively gated to mode four, the resonant frequency is shifted as compared to modes two and three where each half-bridge on the secondary side of $T_1$ has a resonant frequency given by Eq. 8. In this case, due to the current flow reversal on one of the secondaries (e.g., $Ls_1$ or $Ls_2$), the two windings act as if they are in parallel; hence, the resonant capacitance is the parallel combination of both $Cr_1$ and $Cr_2$, while the effective resonant inductance becomes half that of $Lk_1$ or $Lk_2$ plus the close-coupled inductance $Lk_3$=$Lk_4$. The peak current capability of the secondary-side half-bridges 406 is now limited by the difference between the output 406 with the highest voltage and either the other output 406 or the reflected voltage Vi of the primary across the transformer $T_1$. When transferring current from one output to the other the peak current is as shown in Eq. 9, where $V_o+$ is equal to $Vout_1$ and $V_o-$ is equal to $Vout_2$.

$$\text{fr\_3} = \quad (8)$$

$$\frac{1}{2 \cdot \pi \cdot \sqrt{(0.5 \cdot Lk1 + Lk3) \cdot 2 \cdot Cr1}} = \frac{1}{2 \cdot \pi \cdot \sqrt{(0.5 \cdot Lk2 + Lk4) \cdot 2 \cdot Cr2}}$$

$$I_{pk3} = \frac{\frac{1}{\pi} \cdot |Vout1 + Vout2|}{\left|\frac{1}{4 \cdot \pi \cdot fsw \cdot Cr1 \cdot i} + 2 \cdot \pi \cdot fsw \cdot (0.5 \cdot Lk1 + Lk3) \cdot i\right|} = \quad (9)$$

$$\frac{\frac{1}{\pi} \cdot |Vout1 + Vout2|}{\left|\frac{1}{4 \cdot \pi \cdot fsw \cdot Cr2 \cdot i} + 2 \cdot \pi \cdot fsw \cdot (0.5 \cdot Lk2 + Lk4) \cdot i\right|}$$

As shown in the diagram 900, the bidirectional switches $S_3$-$S_6$ have been enabled and the current has reversed direction in the secondary $Ls_2$. The current flow has also been reversed in the primary-side half-bridge 404 sending charge back to the capacitors $Cf_1$ and $Cf_2$ used for energy storage.

The positive output $V_o^+$ half-bridge switches $S_3$ and $S_4$ are soft-switched both at turn-on (ZVS) and turn-off (ZCS). However, the negative side devices $S_5$ and $S_6$ are hard-switched at turn-on and nearly soft-switched at turn-off.

By placing the resonant frequency in the fourth mode to be just lower than that of the switching frequency, hard recovery of device parasitic or co-packed diodes can be minimized. This may be beneficial for device reliability when devices such as MOSFETs are used as the secondary-side switches $S_3$-$S_6$.

Gating the secondary side power devices in and out of bidirectional mode (e.g., into and out of the fourth mode) allows for more efficient operation of the gated bidirectional series resonant converter 402. Full-time use of the bidirectional mode is possible. However, the use of synchronous drive signals can result in additional circulating current in the series resonant tanks, which increases losses when power is intended to be unidirectional from input to output. As stated, careful design allows the gated bidirectional series resonant converter 402 to utilize a lower resonant frequency that is closer to the switching frequency, which reduces circulating current to a minimum when transferring energy from the higher of the voltage outputs 406 to either the input $V_i$ or the other output 406.

The trigger for gating of the bidirectional switches $S_3$-$S_6$ on the secondary side power devices can be chosen based on many inputs such as the supply output voltage(s) 406, derivatives of the supply output voltage(s) 406, the amplifier input signal 104, the amplifier output signal 106, or other inputs depending on how much voltage can be tolerated on the amplifier power devices.

Figure 10:
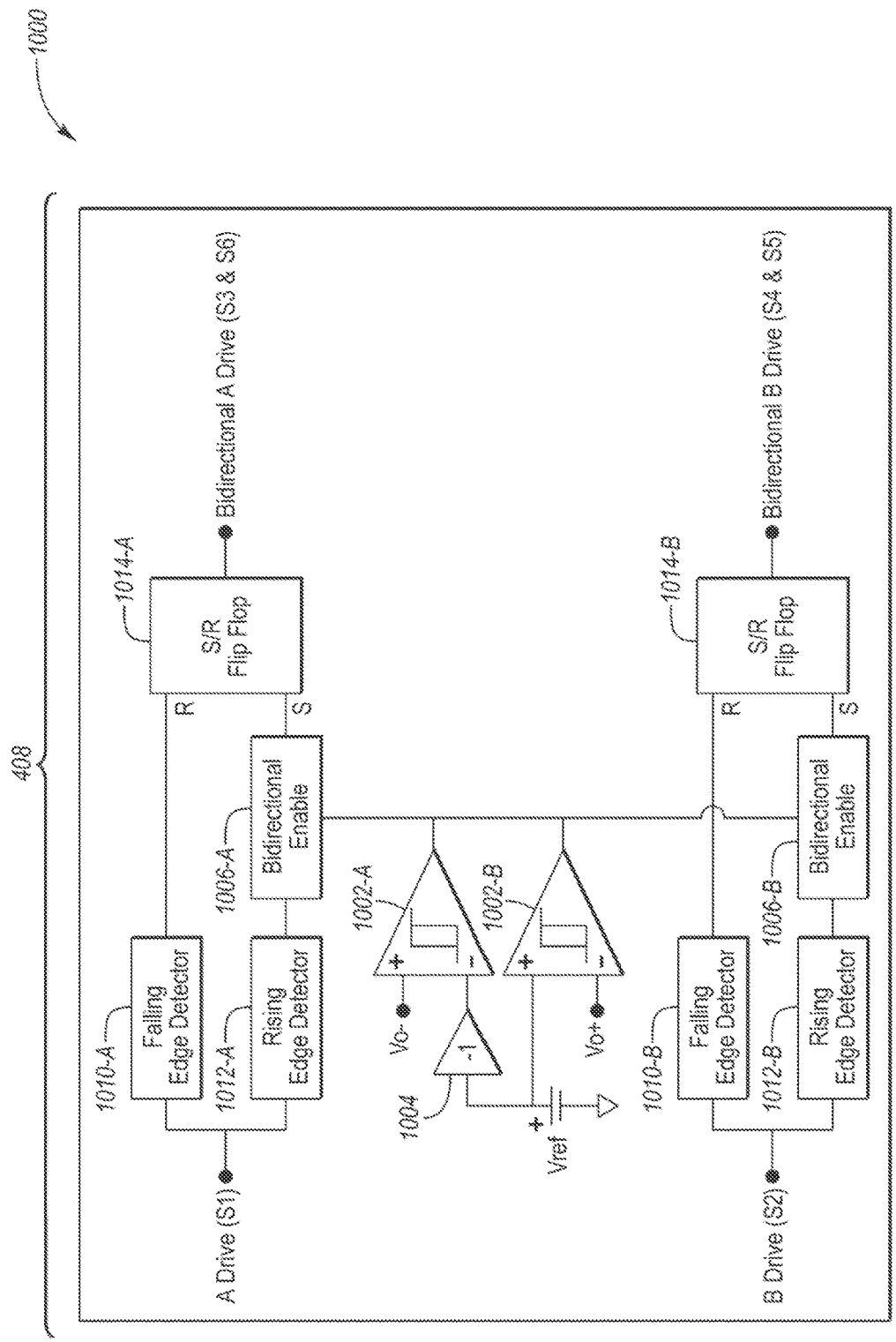
FIG. 10 illustrates an example diagram of bidirectional switch control.

FIG. 10 illustrates an example diagram 1000 of the gated bidirectional switch control 408. As shown, the diagram 1000 demonstrates an example circuit for selective control of the bidirectionality of the secondary-side switches $S_3$-$S_6$. In this example version of the control, the power supply outputs $V_o^+$ and $V_o^-$ are compared to fixed references $V_{ref^+}$ and $V_{ref^-}$ using comparators 1002-A and 1002-B (collectively 1002). For example, the first comparator 1002-A may be used to determine whether the power supply output $V_o^+$ is greater than the $V_{ref^+}$ while the second comparator 1002-B may be used to determine whether the power supply output $V_o^-$ is less than the $V_{ref^-}$. The $V_{ref^-}$ may be generated from the $V_{ref^+}$ using a voltage inverter 1004. Thus, once the absolute value of either power supply output $V_o^+$ or $V_o^-$ exceeds the absolute value of the reference $V_{ref}$, the node at the output of the comparators 1002 may be pulled low (or high, depending on implementation).

The bidirectional enable circuitry 1006 interprets change in comparator 1002 output as a request for bidirectional mode, as the absolute value of one or both power supply output(s) is too high and action is required. In an example, a first bidirectional enable circuit 1006-A may control bidirectional mode enablement for an A-drive of switches $S_3$ and $S_6$ based on a drive signal input driving or otherwise indicative of the state of the switch $S_1$, while a second bidirectional enable circuit 1006-B may control bidirectional mode enablement for a B-drive of switches $S_4$ and $S_5$ based on a drive signal input driving or otherwise indicative of the state of the switch $S_2$.

In creating the appropriate drive signals to the bidirectional switches $S_3$-$S_6$, the gated bidirectional switch control 408 detects whether each of the primary-side drive signals $S_1$ and $S_2$ is on a rising edge or falling edge. As one possibility, a falling edge detector 1010-A may detect whether the drive signal of the switch $S_1$ is on a falling edge, a rising edge detector 1012-A may detect whether the drive signal of the switch $S_1$ is on a rising edge, a falling edge detector 1010-B may detect whether the drive signal of the switch $S_2$ is on a falling edge, a rising edge detector 1012-B may detect whether the drive signal of the switch $S_2$ is on a rising edge.

The bidirectional enable circuitry 1006 may receive signals from the rising edge detector 1012, and may adjust these signals before providing them to the set/reset (S/R) flip-flops 1014 generating the A-drive of switches $S_3$ and $S_6$ and the B-drive of switches $S_4$ and $S_5$.

In an example, the reset inputs to the flip-flops 1014 may be connected to the outputs of the falling edge detectors 1010, and the set inputs to the flip-flops 1014 may be connected to the outputs of the bidirectional enable circuits 1006. For instance, the falling edge detector 1010-A output may be connected to the reset input to the flip-flop 1014-A generating the A-drive of switches $S_3$ and $S_6$, the rising edge detector 1012-A output may be connected to an input of the bidirectional enable circuitry 1006-A, the bidirectional enable circuit 1006-A output may be connected to the set input of the flip-flop 1014-A, the falling edge detector 1010-B output may be connected to the reset input to the flip-flop 1014-B generating the B-drive of switches $S_4$ and $S_5$, the rising edge detector 1012-B output may be connected to an input of the bidirectional enable circuitry 1006-B, and the bidirectional enable circuit 1006-B output may be connected to the set input to the flip-flop 1014-B. Accordingly, the S/R flip-flops 1014 are reset on the falling edges of the drive signals of switches $S_1$ and $S_2$, and, conversely, the S/R flip-flops 1014 are set on the rising edges of the drive signals of switches $S_1$ and $S_2$, so long as the bidirectional enable circuitry 1006 allows it.

As one possibility, each block of bidirectional enable circuitry 1006 may be implemented as an AND logic gate which will not allow the setting of the corresponding S/R flip-flop 1014 unless both the rising edge and the rail sense outputs are high, along with any other protection inputs. Any one input may keep the secondary switches (e.g., $S_3$-$S_6$ in the example diagram 400) in the off state, allowing current to flow only through the diode portions of the switches. By triggering the secondary switches synchronous with the primary side switches (e.g., $S_1$ and $S_2$ in the example diagram 400), currents can be minimized at the time of switching without using external sensor(s) to find where the current crosses zero. Additional circuitry may optionally be added to keep the A and B bidirectional drives from both being on at the same time, which, if occurred, may cause damage or destruction to one or more circuit devices.

Table 1 illustrates an example truth table describing the logic of the simplified bidirectional enable circuitry 1006. Since the switch enabling logic is the same for both sets of switches, it is shown for either the A XOR B drives which are logic XOR functions for this table.

TABLE 1

Truth table for the bidirectional switch control example

| A XOR B rising edge | A XOR B falling edge | \|Vo +/− \| > Vref | A XOR B bidirectional drive |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 1 |

TABLE 1-continued

Truth table for the bidirectional switch control example

| A XOR B rising edge | A XOR B falling edge | \|Vo +/− \| > Vref | A XOR B bidirectional drive |
|---|---|---|---|
| 1 | 1 | 0 | N/A |
| 1 | 1 | 1 | N/A |

Other inputs (not shown) to the bidirectional enable circuitry 1006 may include one or more of a microprocessor-controlled disable, temperature disable, startup-status disable, or any other function or input deemed to be appropriate for disabling bidirectionality of the gated bidirectional series resonant converter 402 (e.g., derivatives of the power supply rail voltage, amplifier input signal level, amplifier output signal level, or other inputs depending on how much voltage can be tolerated on the amplifier power devices).

In this resonant topology, highest efficiency is realized when turning the switches on and off as current resonates down to nearly zero as shown in FIG. 8. If the secondary switches (e.g., $S_3$-$S_6$) are commanded to turn on and off at times other than in synchronicity with the primary switches (e.g., $S_1$ and $S_2$), losses could increase due to rapid commutation of current between the switches and antiparallel diodes due to the non-ideal switching that occurs within power devices.

Triggering the secondary-side switches on the falling edge of the primary switches would also allow the converter to function, but once again the currents may not reach their near zero state during the dead time when neither primary switch is on, thus, in such a situation the bidirectional series resonant converter 402 may suffer relatively higher losses.

Figure 11:
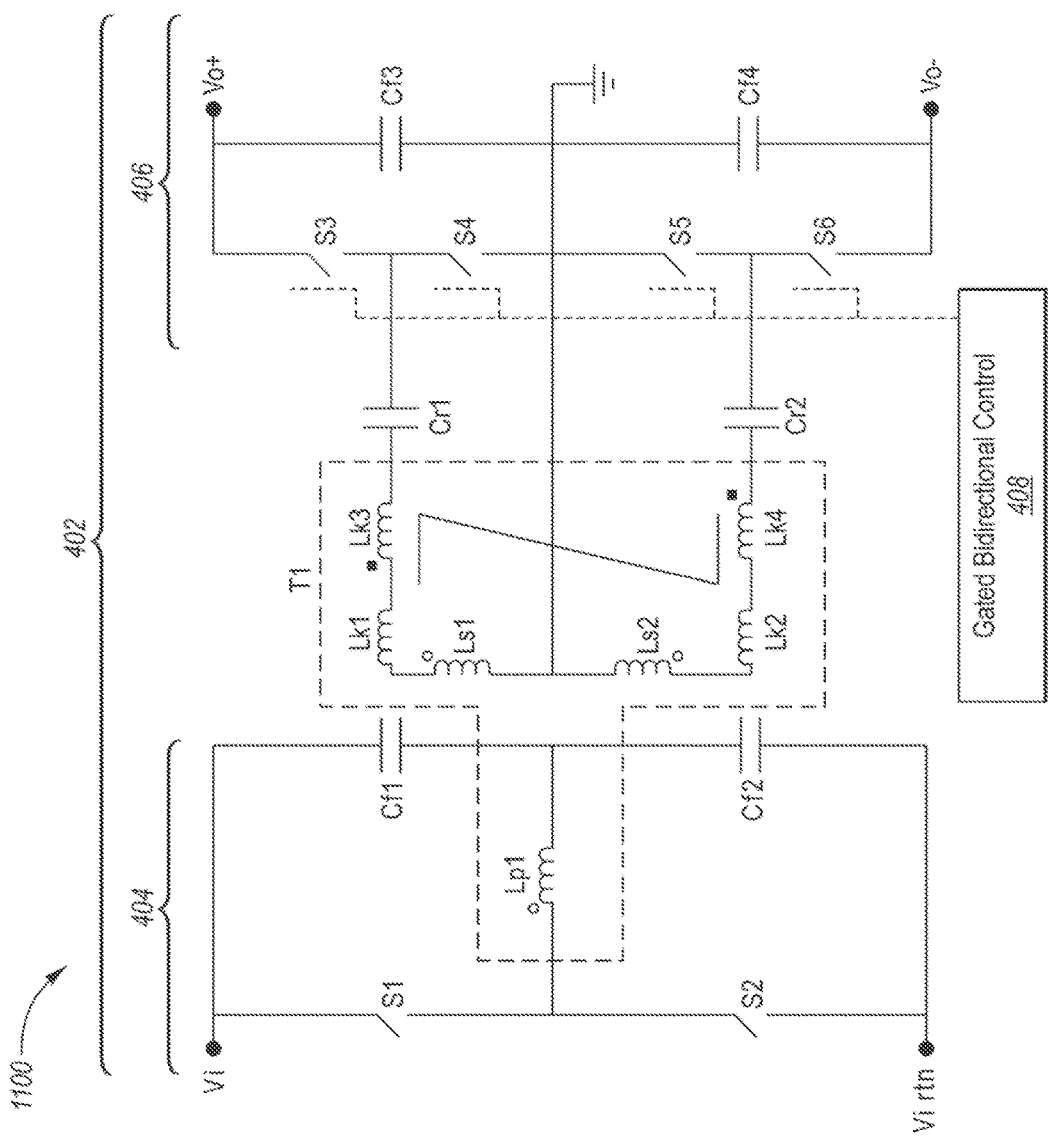
FIG. 11 illustrates an example diagram of an alternate form of the gated bidirectional series resonant converter.

FIG. 11 illustrates an example diagram 1100 of an alternate form of the gated bidirectional series resonant converter 402. As compared to the diagrams described above for a simple-form of the dual rail fixed frequency bidirectional series resonant converter 402, the form of converter 402 shown in the diagram 1100 varies with respect to one winding of the transformer and the associated control for the secondary side switches. More specifically, the transformer winding $Ls_2$ has been inverted in polarity, enabling the secondary-side half-bridges 406 to be driven out of phase with one another. For one half-cycle of switching, the positive output, $V_o^+$, is charged and on the other half-cycle the negative output, $V_o^-$, is charged. Other forms of construction of the gated bidirectional series resonant converter 402 may combine two simultaneous conduction or alternate conduction half-bridges to form full bridges, where both outputs are charged with each half-cycle.

Figure 12:
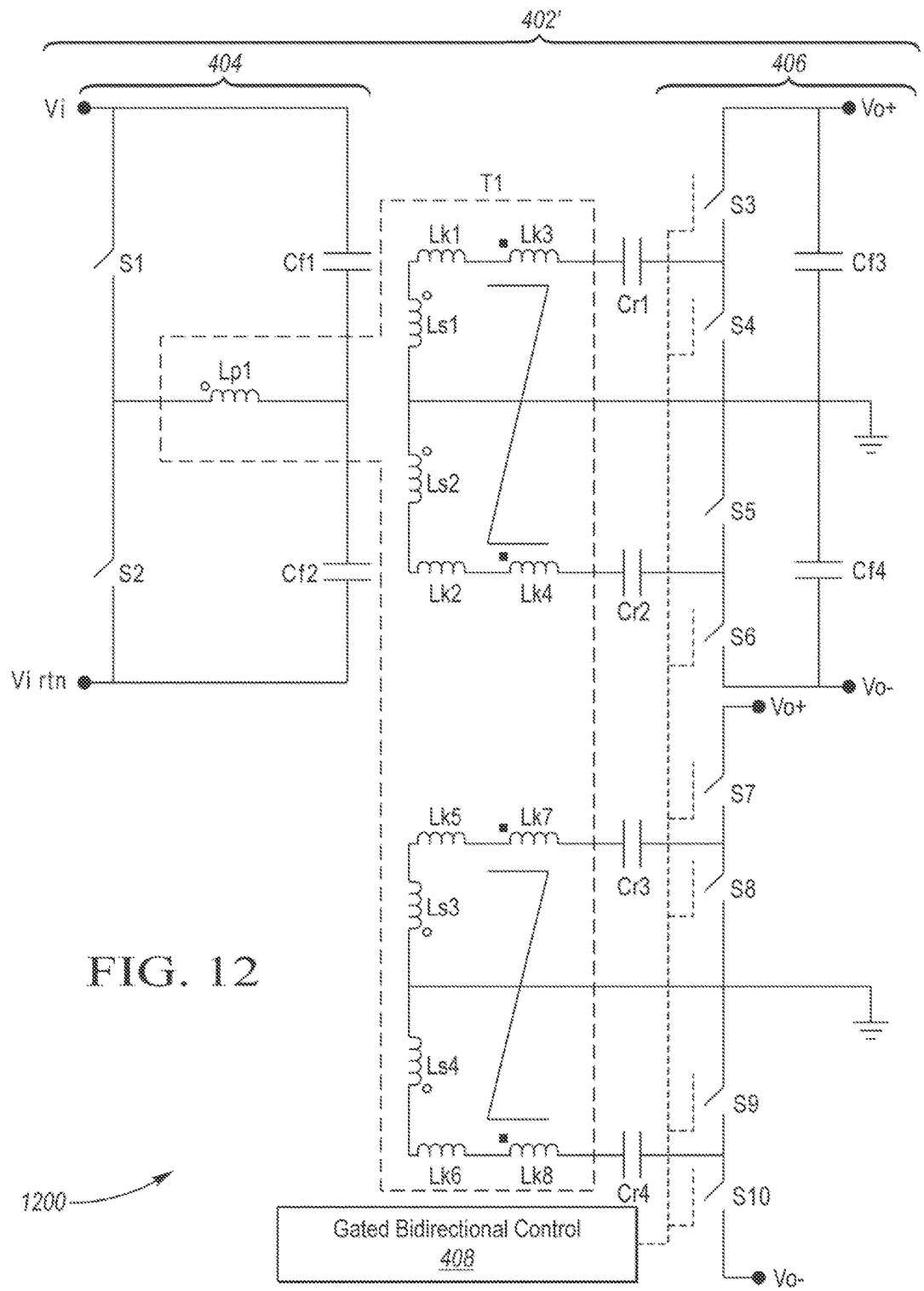
FIG. 12 illustrates an example diagram of a full-bridge simultaneous conduction form of the gated bidirectional series resonant converter.

FIG. 12 illustrates an example diagram 1200 of a full-bridge simultaneous conduction form of the gated bidirectional series resonant converter 402'. As compared to the gated bidirectional series resonant converter 402, the gated bidirectional series resonant converter 402' of the diagram 1200 further includes additional secondaries $Ls_3$ and $Ls_4$ of opposite polarity to the secondaries $Ls_1$ and $Ls_2$ as well as additional resonant inductors $Lk_5$, $Lk_6$, $Lk_7$, and $Lk_8$. The resonant inductors $Lk_5$ and $Lk_6$ are connected in series to the $Ls_3$ secondary, while the resonant inductors $Lk_6$ and $Lk_8$ are connected in series to the $Ls_4$ secondary. A center tap output between the secondaries $Ls_3$ and $Ls_4$ is connected to ground. Thus, the gated bidirectional series resonant converter 402' combines a half-bridge 404 on the primary $Lp_1$ of the integrated transformer $T_1$, and a full bridge on the secondary side, coupled to the secondaries $Ls_1$ and $Ls_2$ of the integrated transformer $T_1$ through capacitors $Cr_1$ and $Cr_2$ and to the secondaries $Ls_3$ and $Ls_4$ through capacitors $Cr_3$ and $Cr_4$. Similar to the switches $S_3$-$S_6$, the switches $S_7$-$S_{10}$ may be controlled by signals generated by the gated bidirectional switch control 408 based on factors such as the state of the switches $S_1$ and $S_2$.

Figure 13:
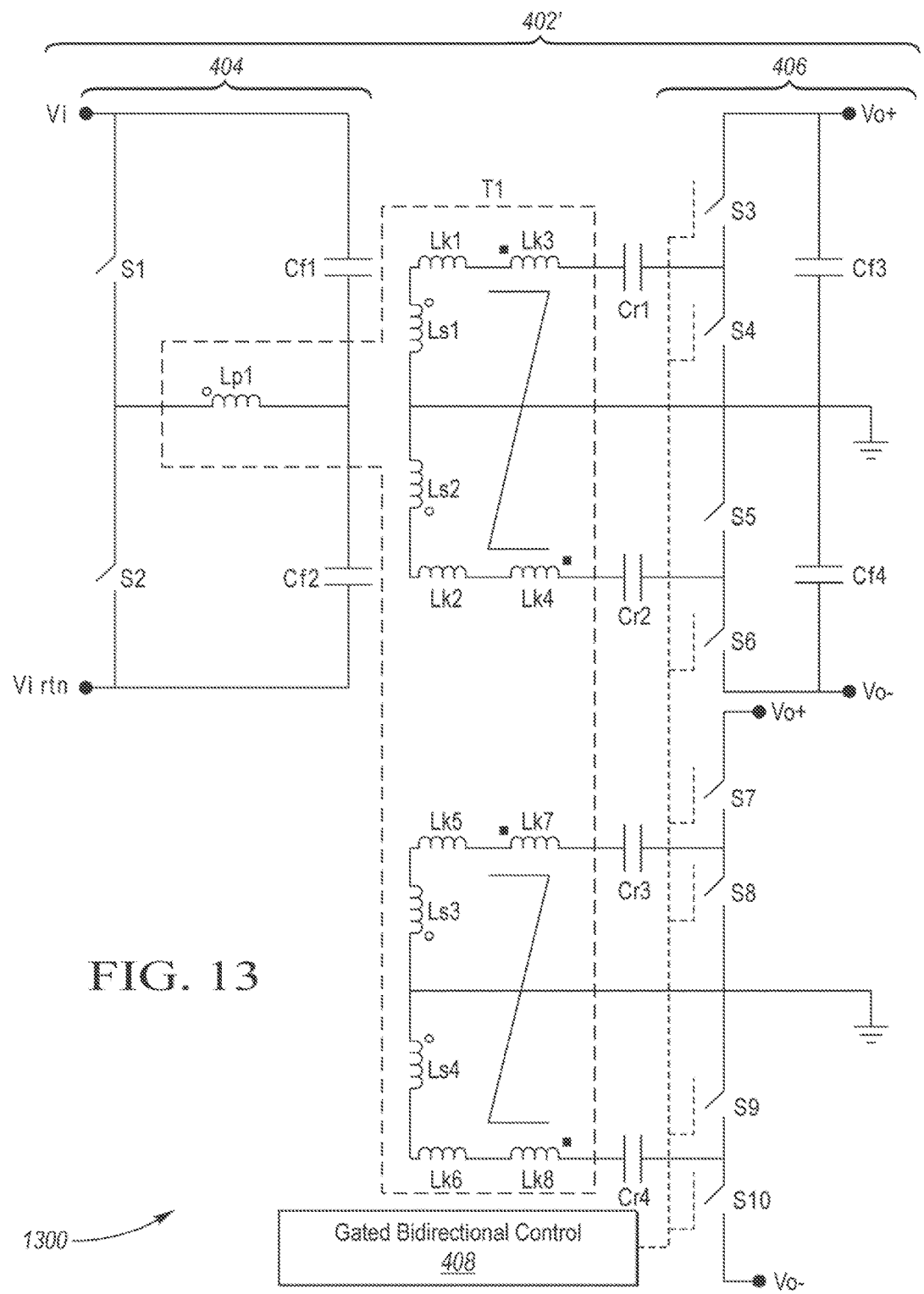
FIG. 13 illustrates an example diagram of a full-bridge alternate conduction form of the gated bidirectional series resonant converter.

FIG. 13 illustrates an example diagram 1300 of a full-bridge alternate conduction form of the gated bidirectional series resonant converter 402'. As compared to the full-bridge simultaneous conduction form of the gated bidirectional series resonant converter 402' shown in the diagram 1200, the form of the converter 402' shown in the diagram 1300 varies with respect inversion in polarity of the transformer windings $Ls_2$ and $Ls_3$, enabling the secondary side full bridges to be driven out of phase with one another.

Generally, the gated bidirectional series resonant converter 402 may provide for power transfer over a galvanically-isolated barrier from an input to a set of dual outputs, from any one output to the other, or from any or both outputs to the input. The gated bidirectional series resonant converter 402 may also function in various modes, including in which secondary side outputs can be switched simultaneously with the primary side power devices with each half-switching cycle, or alternatively with the primary side devices with each half-switching cycle.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system, comprising:
   a switching stage that includes a first plurality of switches configured to produce an alternating current from a bulk voltage;
   a transformer having a primary and a plurality of secondaries, the primary configured to receive the alternating current;
   a second plurality of switches coupled to a first of the plurality of secondaries through a first resonant filter to provide a first voltage output;
   a third plurality of switches coupled to a second of the plurality of secondaries through a second resonant filter to provide a second voltage output, the second voltage output being of opposite polarity to the first voltage output; and
   a controller configured to control the second plurality of switches and the third plurality of switches according to on-and-off state of the first plurality of switches and criteria including whether an absolute value of the first voltage output or the second voltage output exceeds a reference voltage.

2. The system of claim 1, wherein the first plurality of switches includes a first switch and a second switch configured to alternate in operation to produce the alternating current.

3. The system of claim 2, wherein the controller is further configured to, when neither the absolute value of the first voltage output nor the absolute value of the second voltage output exceeds the reference voltage, set a first of the second plurality of switches and a first of the third plurality of switches synchronous in on-and-off time with the first switch of the first plurality of switches, and set a second of the second plurality of switches and a second of the third plurality of switches synchronous in on-and-off time with the second switch of the first plurality of switches.

4. The system of claim 1, wherein the controller is further configured to, when at least one of the absolute value of the first voltage output or the absolute value of the second voltage output exceeds the reference voltage, control the second plurality of switches and the third plurality of switches to provide a path for current to flow back from one or more of the first voltage output or the second voltage output to one or more of the secondaries of the transformer.

5. The system of claim 1, wherein the first resonant filter includes a first inductor integrated with the transformer, and the second resonant filter includes a second inductor integrated with the transformer.

6. The system of claim 1, wherein the first resonant filter includes a first inductor separate from the transformer, and the second resonant filter includes a second inductor separate from the transformer.

7. The system of claim 1, further comprising:
comparators configured to determine whether the first voltage output or second voltage output exceed a reference voltage;
first detectors configured to generate rising edge signals indicating whether the signals driving the first plurality of switches are on rising edges; and
bidirectional enable circuits receiving the rising edge signals and providing outputs, the bidirectional enable circuits configured to (i) adjust the rising edge signals, when a rising edge is detected, to control the second and third plurality of switches in a bidirectional mode when the first voltage output or second voltage output exceed a reference voltage, and to (ii) refrain from adjusting the rising edge signals to control the second and third plurality of switches in a forward mode otherwise.

8. The system of claim 7, further comprising:
second detectors configured to generate falling edge signals indicating whether signals driving the first plurality of switches are on falling edges; and
flip-flops configured to generate drive signals for second and third pluralities of switches based on the falling edge signals and the outputs of the bidirectional enable circuits.

9. The system of claim 7, wherein the criteria further include one or more of a microprocessor-controlled disable signal input to the bidirectional enable circuits that, when set, prevents the bidirectional enable circuits from entering the bidirectional mode, or a temperature disable input to the bidirectional enable circuits that, when set, prevents the bidirectional enable circuits from entering the bidirectional mode.

10. A system comprising:
a bidirectional mode controller of a series resonant converter providing first and second voltage outputs, the series resonant converter including first and second switches configured to provide a pulse train output to a primary of a transformer, third and fourth switches connected to a first secondary of the transformer, and fifth and sixth switches connected to a second secondary of the transformer, the controller configured to
in a first mode, when neither the first voltage output nor an absolute value of the second voltage output exceeds a reference voltage, set the third and sixth switches to a state synchronous in on-and-off time with the first switch for the first voltage output, and set the fourth and fifth switches to a state synchronous in on-and-off time with the second switch for the second voltage output, and
in a second mode, when at least one of the first voltage output or the absolute value of the second voltage output exceeds the reference voltage, control the third, fourth, fifth, and sixth switches to provide a path for current to flow back from one or more of the first voltage output or the second voltage output to one or more of the first secondary or the second secondary of the transformer.

11. The system of claim 10, further comprising:
a first comparator configured to determine whether the first voltage output exceeds the reference voltage, wherein the first voltage output exceeding the reference voltage is indicative of rail pumping on the first voltage output; and
a second comparator configured to determine whether the second voltage output exceeds an inverse of the reference voltage, wherein second voltage output exceeding the inverse of the reference voltage is indicative of rail pumping on the second voltage output.

12. The system of claim 10, further comprising:
a first rising edge detector configured to generate a first rising edge signal indicating whether a signal driving the first switch is on a rising edge;
a second rising edge detector configured to generate a second rising edge signal indicating whether a signal driving the second switch is on a rising edge;
a first bidirectional enable circuit configured to provide an output to control the third and fourth switches into the second mode when the first voltage output exceeds the reference voltage and the signal driving the first switch is on the rising edge; and
a second bidirectional enable circuit configured to provide an output to control the fifth and sixth switches into the second mode when the second voltage output exceeds the reference voltage and the signal driving the second switch is on the rising edge.

13. The system of claim 12, further comprising:
a first falling edge detector configured to generate a falling edge signal indicating whether the signal driving the first switch is on a falling edge; and
a first flip-flop configured to generate a drive signal for the third and fifth switches based on whether the signal driving the first switch is on a falling edge and the output of the first bidirectional enable circuit.

14. The system of claim 13, further comprising:
a second falling edge detector configured to generate a falling edge signal indicating whether the signal driving the second switch is on a falling edge; and
a second flip-flop configured to generate a drive signal for the fourth and sixth switches based on whether the signal driving the second switch is on a falling edge and the output of the second bidirectional enable circuit.

15. A method comprising:
providing, by a bidirectional mode controller of a series resonant converter, first and second voltage outputs, the series resonant converter including first and second switches providing a pulse train output to a primary of a transformer, third and fourth switches connected to a first primary of the transformer, and fifth and sixth switches connected to a second primary of the transformer;
when neither the first voltage output nor an absolute value of the second voltage output exceeds a reference voltage, setting the third and fifth switches to a state synchronous in on-and-off time with the first switch for the first voltage output, and setting the fourth and sixth switches to a state synchronous in on-and-off time with the second switch for the second voltage output; and
when at least one of the first voltage output or the absolute value of the second voltage output exceeds the reference voltage, controlling the third, fourth, fifth, and sixth switches to provide a path for current to flow back from one or more of the first voltage output or the second voltage output to one or more of the first secondary or the second secondary of the transformer.

16. The method of claim 15, further comprising:
determining, by a first comparator, whether the first voltage output exceeds the reference voltage, wherein the first voltage output exceeding the reference voltage is indicative of rail pumping on the first voltage output; and
determining, by a second comparator, whether the second voltage output exceeds an inverse of the reference voltage, wherein second voltage output exceeding the inverse of the reference voltage is indicative of rail pumping on the second voltage output.

17. The method of claim 15, further comprising:
generating, by a first rising edge detector, a first rising edge signal indicating whether a signal driving the first switch is on a rising edge;
generating, by a second rising edge detector, a second rising edge signal indicating whether a signal driving the second switch is on a rising edge;
providing an output, by a first bidirectional enable circuit, controlling the third and fourth switches into a bidirectional mode when the first voltage output exceeds the reference voltage and the signal driving the first switch is on the rising edge; and
providing an output, by a second bidirectional enable circuit, controlling the fifth and sixth switches into a bidirectional mode when the second voltage output exceeds the reference voltage and the signal driving the second switch is on the rising edge.

18. The method of claim 17, further comprising:
generating, by a first falling edge detector, a falling edge signal indicating whether the signal driving the first switch is on a falling edge; and
generating, by a first flip-flop, a drive signal for the third and fifth switches based on whether the signal driving the first switch is on a falling edge and the output of the first bidirectional enable circuit.

19. The method of claim 17, further comprising:
generating, by a second falling edge detector, a falling edge signal indicating whether the signal driving the second switch is on a falling edge; and
generating, by a second flip-flop, a drive signal for the fourth and sixth switches based on whether the signal driving the second switch is on a falling edge and the output of the second bidirectional enable circuit.

20. The method of claim 15, further comprising preventing the bidirectional enable circuits from entering bidirectional mode responsive to one or more of a microprocessor-controlled disable signal input, or a temperature disable input.

* * * * *